(12) United States Patent
Xu (10) Patent No.: US 9,880,657 B2
(45) Date of Patent: Jan. 30, 2018

(54) TOUCH-SENSITIVE PANEL, METHOD, AND METHOD OF MANUFACTURING THE SAME

(71) Applicant: SHENZHEN CHINA STAR OPTOELECTRONICS TECHNOLOGY CO., LTD., Shenzhen, Guangdong (CN)

(72) Inventor: Hongyuan Xu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 203 days.

(21) Appl. No.: 14/781,043

(22) PCT Filed: Apr. 30, 2015

(86) PCT No.: PCT/CN2015/078081
§ 371 (c)(1),
(2) Date: Sep. 29, 2015

(87) PCT Pub. No.: WO2016/165170
PCT Pub. Date: Oct. 20, 2016

(65) Prior Publication Data
US 2017/0139519 A1   May 18, 2017

(30) Foreign Application Priority Data

Apr. 13, 2015 (CN) .......................... 2015 1 0171004

(51) Int. Cl.
*G06F 3/041* (2006.01)
*G09G 3/3208* (2016.01)

(52) U.S. Cl.
CPC .......... *G06F 3/0416* (2013.01); *G06F 3/0414* (2013.01); *G09G 3/3208* (2013.01); *G06F 2203/04103* (2013.01)

(58) Field of Classification Search
CPC ................. G06F 3/0416; G06F 3/0414; G06F 2203/04103; G09G 3/3208
See application file for complete search history.

(56) References Cited

U.S. PATENT DOCUMENTS

| | | | | |
|---|---|---|---|---|
| 2002/0101399 A1* | 8/2002 | Kubo | .................. | G02F 1/13338 345/104 |
| 2002/0190924 A1* | 12/2002 | Asano | ................. | H01L 27/3248 345/55 |
| 2003/0011556 A1* | 1/2003 | Morita | ................. | G09G 3/2092 345/98 |

* cited by examiner

*Primary Examiner* — Sejoon Ahn
(74) *Attorney, Agent, or Firm* — Soroker Agmon Nordman (57) ABSTRACT

A touch-sensitive panel, touch-sensing method, and method for manufacturing the same are provided. The touch-sensitive panel includes a substrate, an induction line array layer, a dielectric layer, and an LED display panel. The induction line and the scanning line of the LED display panel intersect, and the induction line, the dielectric layer, and the scanning line form an inducing capacitor, which is utilized to generate a touch-sensing signal when the touch-sensitive panel is acted upon by an applied force. The present invention enables the display panel with the touch-sensing function to be thinner.

1 Claim, 7 Drawing Sheets

TOUCH-SENSITIVE PANEL, METHOD, AND METHOD OF MANUFACTURING THE SAME

TECHNICAL FIELD OF THE INVENTION

The present invention relates to a display technology, and in particular to a touch-sensitive panel, method, and method for manufacturing the same.

BACKGROUND OF THE INVENTION

Conventional touch-sensitive panel generally also has an image display function and a touch-sensing function. The image display function is achieved through a display panel in the touch-sensitive panel, and the touch-sensing function is achieved through a touch pad or touch-sensing circuitry in the touch-sensitive panel.

Technical solutions to the conventional touch-sensitive panel for achieving the above functions generally include two types.

First, the touch pad is superimposed on the display panel; that is, the display panel and the touch pad are superimposed as a whole; the second, the touch sensing circuitry is integrated within the display panel.

The thicknesses of the touch-sensitive panel in the two technical solutions are generally large and thus not suitable for a trend toward compact touch-sensitive panel.

Therefore, there is a significant need to provide a new technical solution for solving the above-mentioned technical problem.

SUMMARY OF THE INVENTION

An objective of the present invention is to provide a touch-sensitive panel, touch-sensing method, and method for manufacturing the same, which enable a display panel with a touch-sensing function to be thinner.

To achieve the foregoing objective, the technical solution of this invention is implemented as follows.

A touch-sensitive panel includes: a substrate; an induction line array layer disposed on the substrate, the induction line array layer comprising: at least one induction line; a dielectric layer disposed on the induction line array layer; and a light-emitting diode (LED) display panel disposed on the dielectric layer, the LED display panel comprising: at least one display device; at least one scanning line disposed on the dielectric layer for providing scanning signals; at least one data line utilized to provide data signals; and at least one control device coupled to the scanning line, the data line, and the display device for controlling the display device to display images according to the scanning signals and the data signals; wherein the induction line and the scanning line intersect, and the induction line, the dielectric layer, and the scanning line form an inducing capacitor, which is utilized to generate a touch-sensing signal when the touch-sensitive panel is acted upon by an applied force of a touch object; the touch-sensitive panel further comprising: a calculating circuit coupled to the induction line, the calculating circuit utilized to receive the touch-sensing signal from the induction line, and calculate a position of the applied force of the touch object on the touch-sensitive panel according to the touch-sensing signal and the scanning signals; the scanning signals given by two adjacent scanning lines differ by a high level duration; the LED display panel further comprising: a storage capacitor, a first plate of the storage capacitor coupled to the first drain, a second plate of the storage capacitor coupled to the second source, the storage capacitor utilized to receive the data signals when the first current channel is turned on, store charges which correspond to the data signals, and release the charges to the second gate when the first current channel is turned off for making the second current channel remain an on state.

In the touch-sensitive panel, the control device comprises: a first TFT switch, the first TFT comprising: a first gate coupled to the scanning line, the first gate utilized to receive the scanning signal; a first source coupled to the data line, the first source utilized to receive the data signal; and a first drain; wherein the first TFT switch is utilized to control on and off states of a first current channel between the first source and the first drain; a second TFT switch, the second TFT comprising: a second gate coupled to the first drain; a second source coupled to the display device; and a second drain; wherein the second TFT switch is utilized to control on and off states of a second current channel between the second source and the second drain according to the data signals when the first current channel is turned on.

In the touch-sensitive panel, the display device comprises a cathode layer, an organic emissive layer, and an anode layer, wherein the organic emissive layer is disposed between the cathode layer and the anode layer, and the anode layer is coupled to the second drain through a second through hole.

In the touch-sensitive panel, a width of a first region in the induction line is less than a width of a second region, wherein the first region is a region that the induction line and the scanning line intersect, and the second region is a region except the first region in the induction line.

In the touch-sensitive panel, a width of a third region in the scanning line is less than a width of a fourth region, wherein the third region is a region that the scanning line and the induction line intersect, and the fourth region is a region except the third region in the scanning line.

A touch-sensitive panel includes: a substrate; an induction line array layer disposed on the substrate, the induction line array layer comprising: at least one induction line; a dielectric layer disposed on the induction line array layer; and a light-emitting diode (LED) display panel disposed on the dielectric layer, the LED display panel comprising: at least one display device; at least one scanning line disposed on the dielectric layer for providing scanning signals; at least one data line utilized to provide data signals; and at least one control device coupled to the scanning line, the data line, and the display device for controlling the display device to display images according to the scanning signals and the data signals; wherein the induction line and the scanning line intersect, and the induction line, the dielectric layer, and the scanning line form an inducing capacitor, which is utilized to generate a touch-sensing signal when the touch-sensitive panel is acted upon by an applied force of a touch object.

In the touch-sensitive panel, the touch-sensitive panel further includes: a calculating circuit coupled to the induction line, the calculating circuit utilized to receive the touch-sensing signal from the induction line, and calculate a position of the applied force of the touch object on the touch-sensitive panel according to the touch-sensing signal and the scanning signals.

In the touch-sensitive panel, the scanning signals given by two adjacent scanning lines differ by a high level duration.

In the touch-sensitive panel, the control device comprises: a first TFT switch, the first TFT comprising: a first gate coupled to the scanning line, the first gate utilized to receive the scanning signal; a first source coupled to the data line, the first source utilized to receive the data signal; and a first drain; wherein the first TFT switch is utilized to control on and off states of a first current channel between the first source and the first drain; a second TFT switch, the second TFT comprising: a second gate coupled to the first drain; a second source coupled to the display device; and a second drain; wherein the second TFT switch is utilized to control on and off states of a second current channel between the second source and the second drain according to the data signals when the first current channel is turned on.

In the touch-sensitive panel, the display device comprises a cathode layer, an organic emissive layer, and an anode layer, wherein the organic emissive layer is disposed between the cathode layer and the anode layer, and the anode layer is coupled to the second drain through a second through hole.

In the touch-sensitive panel, the LED display panel further includes: a storage capacitor, a first plate of the storage capacitor coupled to the first drain, a second plate of the storage capacitor coupled to the second source, the storage capacitor utilized to receive the data signals when the first current channel is turned on, store charges which correspond to the data signals, and release the charges to the second gate when the first current channel is turned off for making the second current channel remain an on state.

In the touch-sensitive panel, a width of a first region in the induction line is less than a width of a second region, wherein the first region is a region that the induction line and the scanning line intersect, and the second region is a region except the first region in the induction line.

In the touch-sensitive panel, a width of a third region in the scanning line is less than a width of a fourth region, wherein the third region is a region that the scanning line and the induction line intersect, and the fourth region is a region except the third region in the scanning line.

In the touch-sensitive panel, the display device is coupled to a high level connecting end, and the second drain is coupled to a low level connecting end.

In the touch-sensitive panel, the display device is coupled to the low level connecting end, and the second drain is coupled to the high level connecting end.

A method for sensing touch according to the above-mentioned touch-sensitive panel includes the following steps of: A, controlling the display device to display images according to the scanning signals and the data signals by the control device; B, generating a touch-sensing signal when the touch-sensitive panel is acted upon by the applied force of the touch object by the inducing capacitor formed by the induction line, the dielectric layer, and the scanning line.

In the method for sensing touch according to the above-mentioned touch-sensitive panel, the method further includes the following steps of: C, receiving the touch-sensing signal from the induction line by the calculating circuit, and calculating a position of the applied force of the touch object on the touch-sensitive panel according to the touch-sensing signal and the scanning signals.

In the method for sensing touch according to the above-mentioned touch-sensitive panel, the scanning signals given by two adjacent scanning lines differ by a high level duration.

A method for manufacturing the above-mentioned touch-sensitive panel includes the steps of: D, disposing a first metal layer on the substrate; E, patterning the first metal layer to form the at least one induction line; F, disposing the dielectric layer on the substrate and the induction line; G, disposing a second metal layer on the dielectric layer; H, patterning the second metal layer to form the at least one scanning line, wherein the scanning line and the induction line intersect, and the induction line, the dielectric layer and the scanning line form the inducing capacitor; and I, forming a switching device, the data line and the display device on the dielectric layer and the scanning line.

In the method for manufacturing the touch-sensitive panel, the step D comprises: disposing the first metal layer on the substrate through sputtering or evaporation; the step G comprises: disposing the second metal layer on the dielectric layer through sputtering or evaporation.

In comparison with the prior art, the present invention enables the display panel with the touch-sensing function to be thinner.

It is to be understood that both the foregoing general description and the following detailed description of the present invention are exemplary and explanatory and are intended to provide further explanation of the invention as claimed.

DETAILED DESCRIPTION OF THE INVENTION

The word "embodiment" is used herein to mean an example, instance, or illustration. In addition, articles "a" and "an" as used in this application and the appended claims should generally be construed to mean "one or more" unless specified otherwise or clear from the context to be directed to a singular form.

Figure 1:
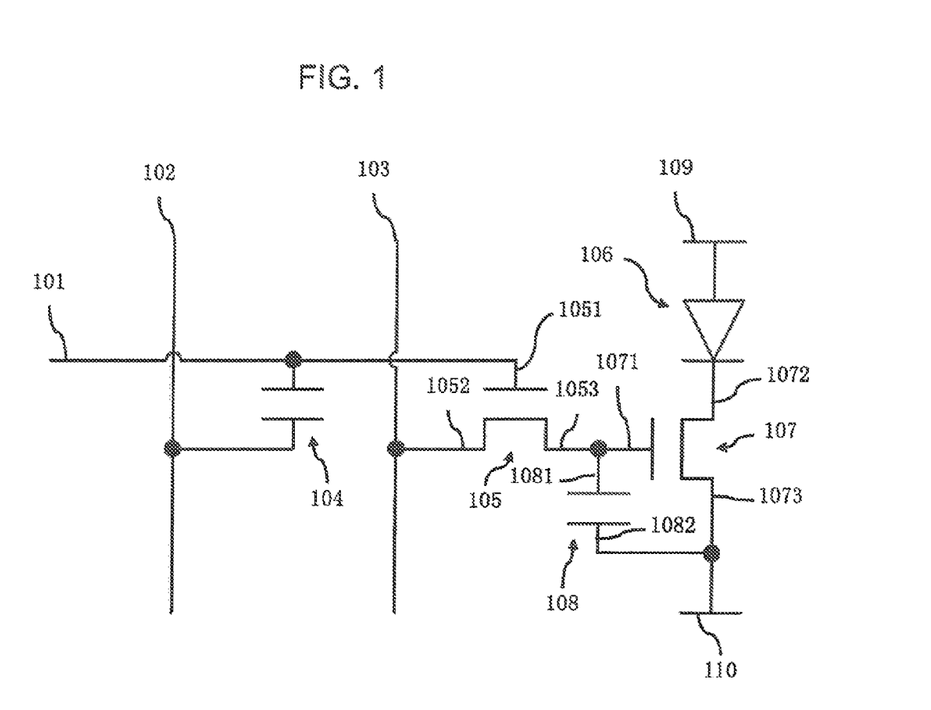
FIG. 1 is a circuit diagram illustrating a touch-sensitive panel of a first embodiment of the present invention.
Figure 4:
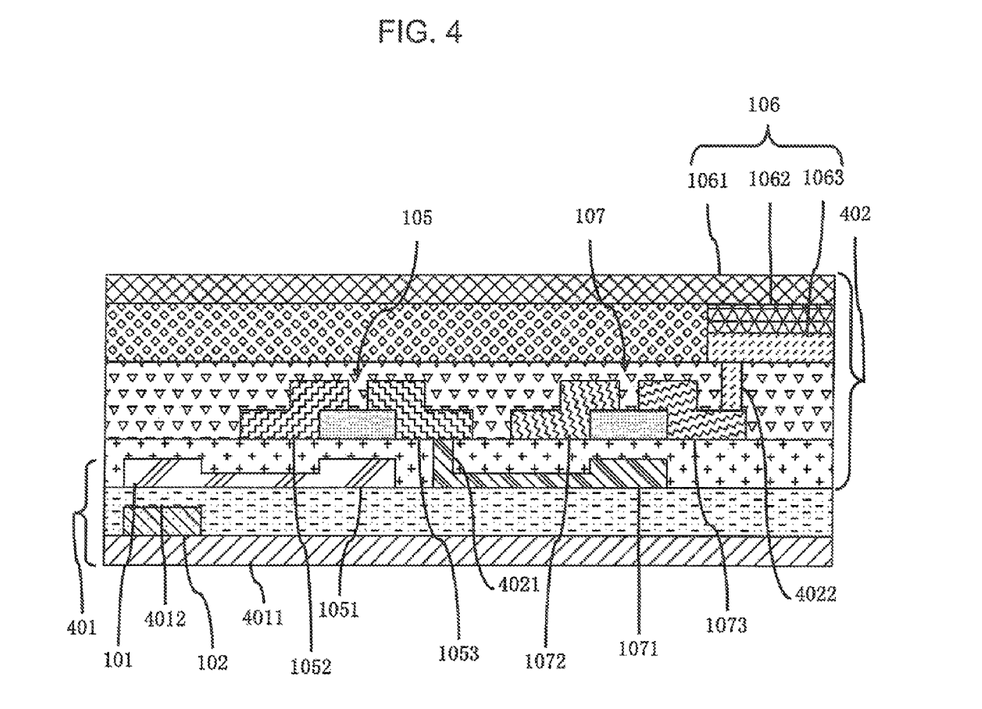
FIG. 4 is a schematic cross-sectional view illustrating the touch-sensitive panel of the present invention.

Referring to FIG. 1 and FIG. 4, FIG. 1 is a circuit diagram illustrating a touch-sensitive panel of a first embodiment of the present invention; FIG. 4 is a schematic cross-sectional view illustrating a touch-sensitive panel of the present invention.

The touch-sensitive panel of the embodiment includes a substrate 4011, an induction line array layer, a dielectric layer 4012, and an LED display panel 402, where the substrate 4011, the induction line array layer, the dielectric layer 4012, and the LED display panel 402 are superimposed as a whole.

The induction line array layer is disposed on the substrate 4011, and the induction line array layer includes at least one induction line 102. The dielectric layer 4012 is disposed on the induction line array layer. The LED display panel 402 is disposed on the dielectric layer 4012, and the LED display panel 402 includes a display device 106, a scanning line 101, a data line 103, and a control device.

The scanning line 101 is disposed on the dielectric layer 4012, and the scanning line 101 is used for providing scanning signals. The data line 103 is utilized to provide data signals. The control device is coupled to the scanning line 101, the data line 103, and the display device 106, and the control device is utilized to control the display device 106 to display images according to the scanning signals and the data signals.

The induction line 102 and the scanning line 101 intersect, and the induction line 102, the dielectric layer 4012, and the scanning line 101 form an inducing capacitor 104, which is utilized to generate a touch-sensing signal when the touch-sensitive panel is acted upon by an applied force of a touch object.

In the embodiment, the control device includes a first TFT switch 105, a second TFT switch 107, and a storage capacitor 108.

The first TFT switch 105 includes a first gate 1051, a first source 1052, and a first drain 1053. The first gate 1051 is coupled to the scanning line 101, and the opening gate 1051 is utilized to receive the scanning signals. The first source 1052 is coupled to the data line 103, and the first source 1052 is utilized to receive the data signals. The first TFT switch 105 herein is utilized to control on and off states of a first current channel between the first source 1052 and the first drain 1053.

The second TFT switch 107 includes a second gate 1071, a second source 1072, and a second drain 1073. The second gate 1071 is coupled to the first drain 1053. The second source 1072 is coupled to the display device 106. The second TFT switch 107 herein is utilized to control on and off states of a second current channel between the second source 1072 and the second drain 1073 according to the data signals when the first current channel is turned on. The second gate 1071 is coupled to the first drain 1053 via a first through hole 4021.

The display device 106 includes a cathode layer 1061, an organic emissive layer 1062, and an anode layer 1063, wherein the organic emissive layer 1062 is disposed between the cathode layer 1061 and the anode layer 1063. The anode layer 1063 is coupled to the second drain 1073 via a second through hole 4022.

A first plate 1081 of the storage capacitor 108 is coupled to the first drain 1053, and a second plate 1082 of the storage capacitor 108 is coupled to the second source 1072. The storage capacitor 108 is utilized to receive the data signals when the first current channel is turned on, store charges which correspond to the data signals, and release the charges to the second gate 1071 when the first current channel is turned off for making the second current channel remain an on state.

The display device 106 is coupled to a high level connecting end 109, and the second drain 1073 is coupled to a low level connecting end 110. Alternatively, the display device 106 is coupled to the low level connecting end 110, and the second drain 1073 is coupled to the high level connecting end 109.

In the above-mentioned technical solution, integrating a touch sensing circuitry 401 in display panel enables the display panel with the touch-sensing function to be thinner.

Figure 2:
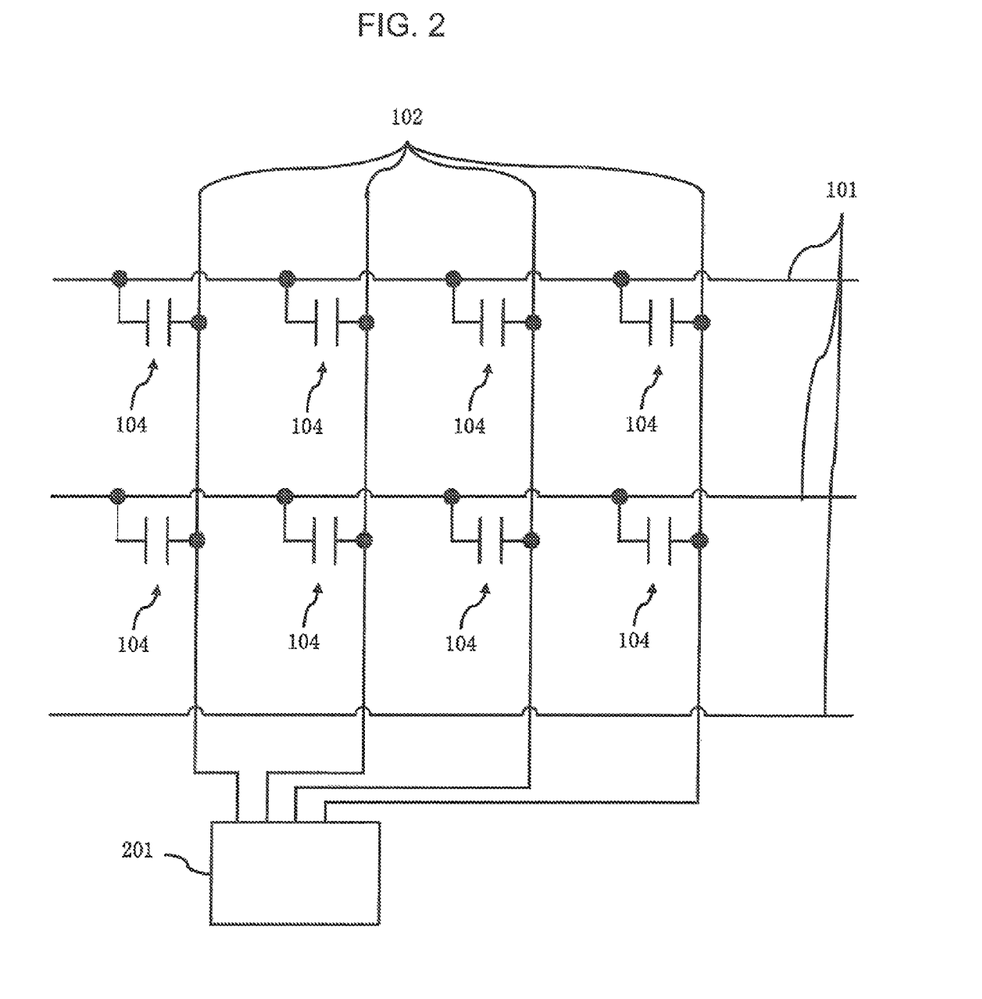
FIG. 2 is a schematic drawing illustrating a touch sensing circuitry composed of a scanning line, an induction line and a calculating circuit in the touch-sensitive panel of the present invention.

The difference between a second embodiment of the touch-sensitive panel of the present invention and the above first embodiment is that:

In the embodiment, the touch-sensitive panel further includes a calculating circuit 201, and the calculating circuit 201 is coupled to the induction line 102. The calculating circuit 201 is utilized to receive the touch-sensing signal from the induction line 102, and calculate a position of the applied force of the touch object on the touch-sensitive panel according to the touch-sensing signal and the scanning signals.

Figure 3:
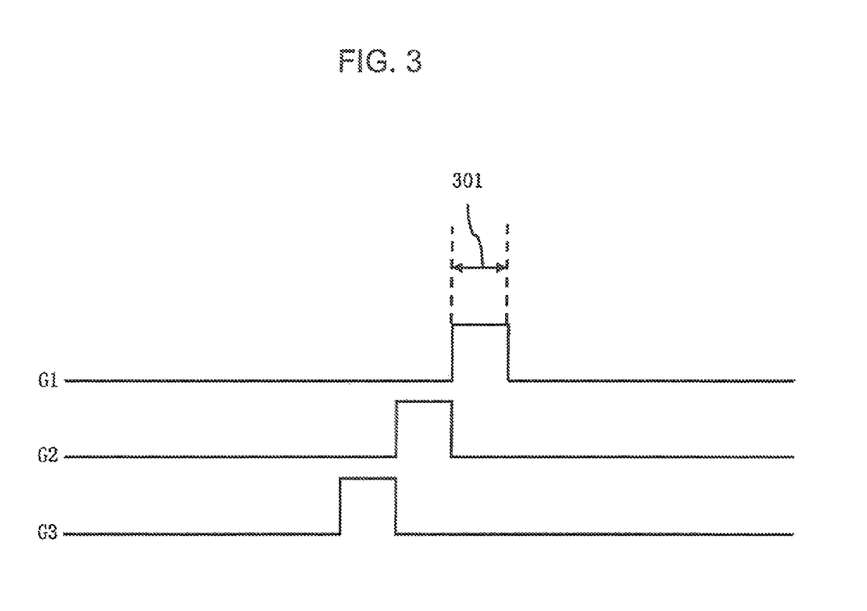
FIG. 3 is a schematic drawing illustrating waveforms of scanning signals given by the scanning line in the touch-sensitive panel of the present invention.

In the embodiment, the scanning signals given by two adjacent scanning lines 101 differ by a high level duration 301, as shown in FIG. 3.

Referring to FIG. 2, FIG. 2 is a schematic drawing illustrating a touch sensing circuitry 401 composed of the scanning line 101, the induction line 102 and the calculating circuit 201 in the touch-sensitive panel of the present invention. It can be seen from FIG. 2 that, in the present invention, after a scanning line array composed of m scanning lines 101 and an induction line array composed of n induction lines 102 are superimposed as a whole (the dielectric layer 4012 is disposed between the scanning line array and the induction line array), an inducing capacitor array of m rows and n columns is formed in the touch-sensitive panel, and the inducing capacitor array includes m*n inducing capacitances 104. The touch sensing circuitry 401 is composed of the inducing capacitor array, the scanning line array, the induction line array and the calculating circuit 201. Both m and n herein are a positive integer.

The difference between a third embodiment of the touch-sensitive panel of the present invention and the above first embodiment or the second embodiment is that:

in the embodiment, a width of a first region in the induction line 102 is less than a width of a second region, wherein the first region is a region that the induction line 102 and the scanning line 101 intersect, and the second region is a region except the first region in the induction line 102; and/or a width of a third region in the scanning line 101 is less than a width of a fourth region, wherein the third region is a region that the scanning line 101 and the induction line 102 intersect, and the fourth region is a region except the third region in the scanning line 101.

This helps to reduce the capacitance of the inducing capacitor 104, thereby improving the touch-sensing accuracy of the touch-sensitive panel.

Figure 5:
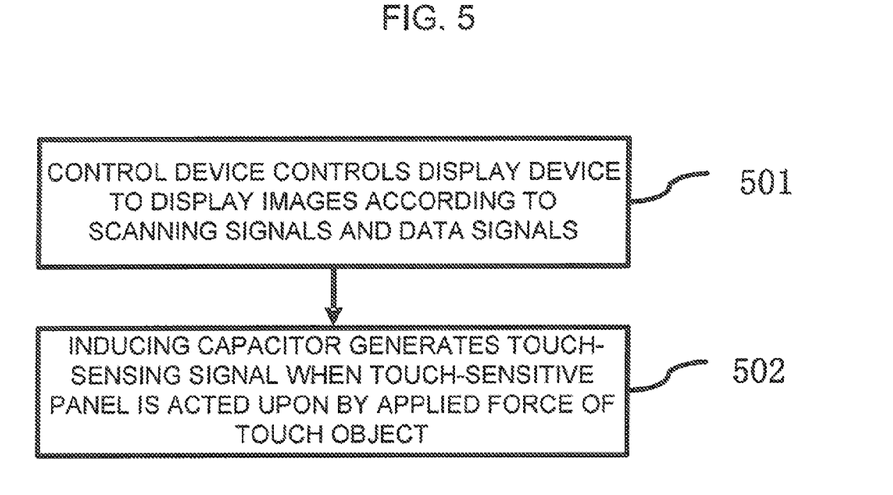
FIG. 5 is a flow chart illustrating a method of sensing touch of the touch-sensitive panel of the first embodiment of the present invention.

Refer to FIG. 5, which is a flow chart illustrating a method of sensing touch of the touch-sensitive panel of the first embodiment of the present invention. The method of sensing touch of the touch-sensitive panel of the embodiment includes the following steps.

A (step 501), the control device 106 controls the display device 106 to display images according to the scanning signals and the data signals.

B (step 502), an inducing capacitor 104, which is formed by the induction line 102, the dielectric layer 4012, and the scanning line 101, generates a touch-sensing signal when the touch-sensitive panel is acted upon by an applied force of a touch object.

Figure 6:
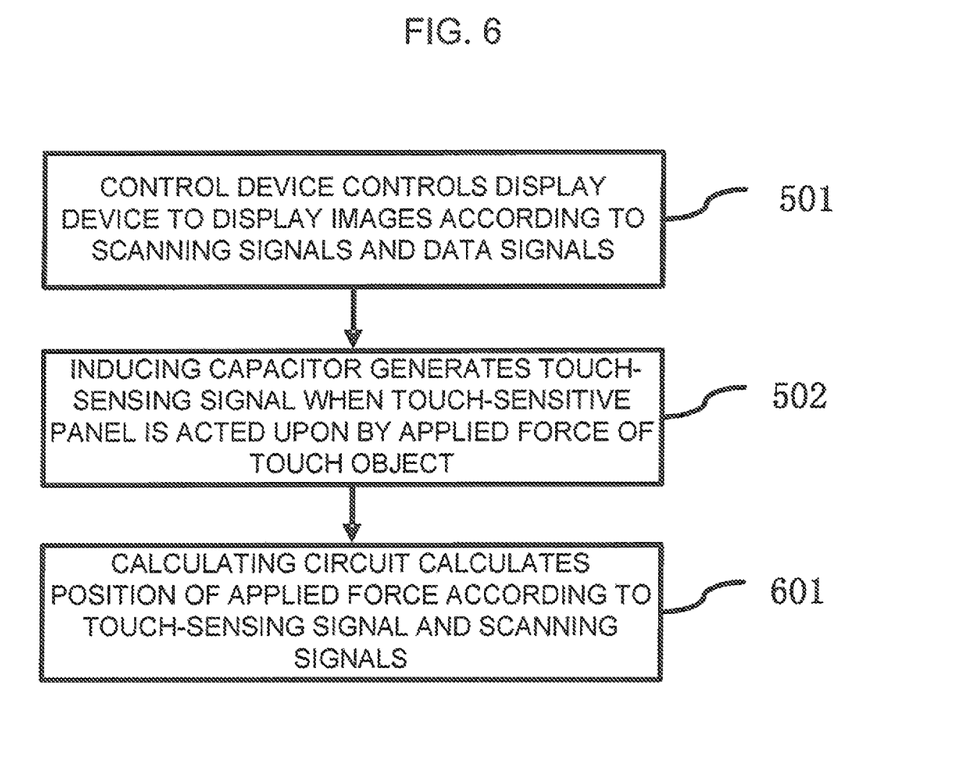
FIG. 6 is a flow chart illustrating a method of sensing touch of the touch-sensitive panel according to a second embodiment of the present invention.

FIG. 6 is a flow chart illustrating a method of sensing touch of the touch-sensitive panel according to a second embodiment of the present invention. The difference between the embodiment and the first embodiment is that:

In the embodiment, the method further includes the following step.

C (step 601), the calculating circuit 201 receives the touch-sensing signal from the induction line 102, and calculates a position of the applied force of the touch object on the touch-sensitive panel according to the touch-sensing signal and the scanning signals.

In the embodiment, the scanning signals given by two adjacent scanning lines 101 differ by a high level duration 301, as shown in FIG. 3.

Figure 7:
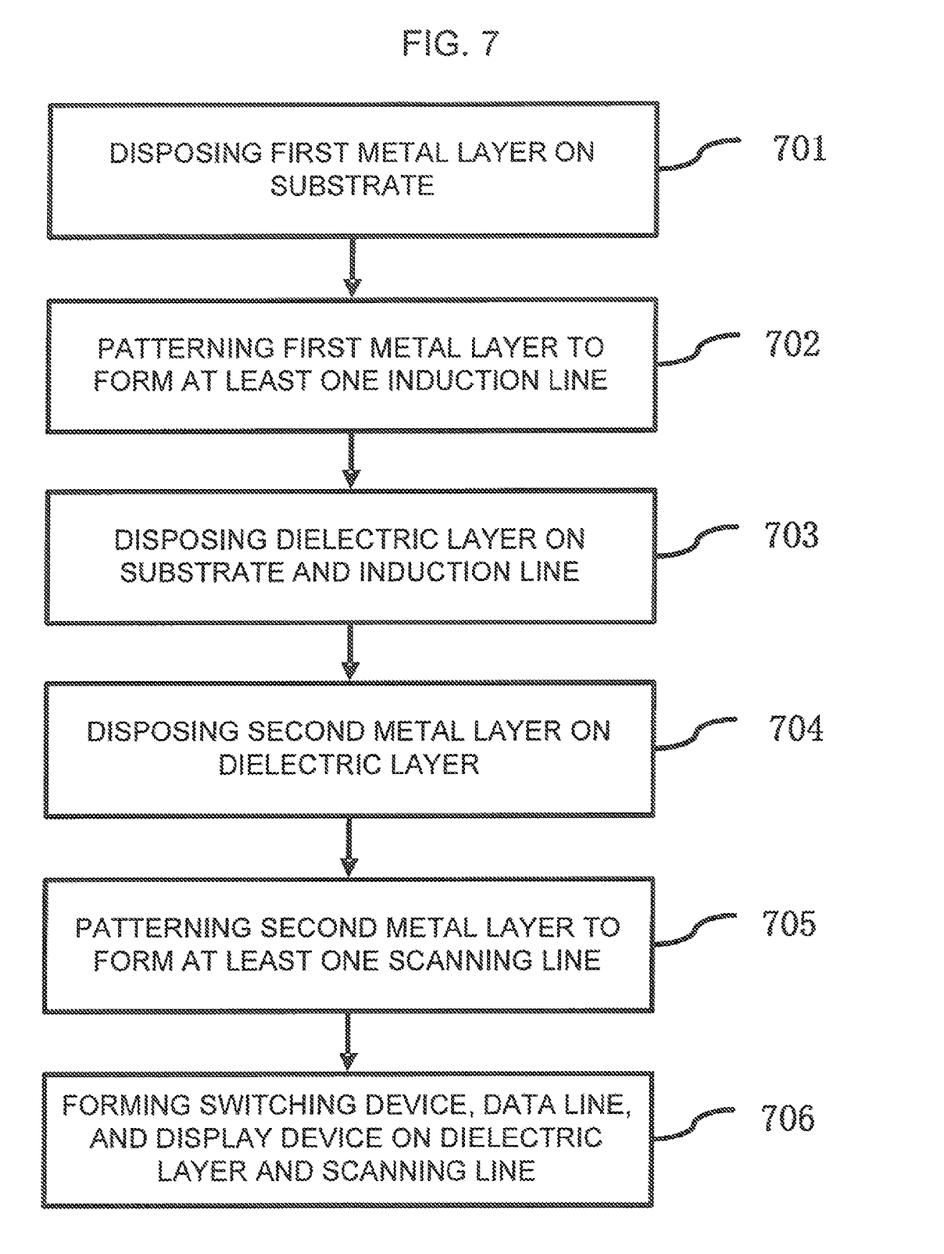
FIG. 7 is a flow chart illustrating a method for manufacturing the touch-sensitive panel of the present invention.

Refer to FIG. 7, which is a flow chart illustrating a method for manufacturing the touch-sensitive panel of the present invention. In the embodiment, the method includes the following steps.

D (step 701), a first metal layer is disposed on the substrate 4011.

E (step 702), the first metal layer is patterned to form the at least one induction line 102.

F (step 703), a dielectric layer 4012 is disposed on the substrate 4011 and the induction line 102.

G (step 704), a second metal layer is disposed on the dielectric layer 4012.

H (step 705), the second metal layer is patterned to form the at least one scanning line 101, wherein the scanning line 101 and the induction line 102 intersect, and the induction line 102, the dielectric layer 4012 and the scanning line 101 form an inducing capacitor 104.

I (step 706), a switching device, the data line 103 and the display device 106 are formed on the dielectric layer 4012 and the scanning line 101.

In the embodiment, the step D (step 701) specifically is: disposing the first metal layer on the substrate 4011 through sputtering or evaporation.

The step G (step 704) specifically is: disposing the second metal layer on the dielectric layer 4012 through sputtering or evaporation.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A touch-sensitive panel, comprising:
a substrate;
an induction line array layer disposed on the substrate, wherein the induction line array layer includes at least one induction line;
a dielectric layer disposed on the induction line array layer; and
a light-emitting diode (LED) display panel disposed on the dielectric layer, wherein the LED display panel includes at least one display device;
a plurality of scanning lines disposed on the dielectric layer for providing scanning signals;
a plurality of data lines arranged to provide data signals; and
at least one control device coupled to each of the scanning lines, each of the data lines, and the display device, wherein the control device is configured to control the display device to display images according to the scanning signals and the data signals,
wherein the induction line and the scanning line intersect with each other,
wherein an inducing capacitor is formed by the induction line, the dielectric layer, and the scanning line, wherein the inducing capacitor is configured to generate a touch-sensing signal when the touch-sensitive panel is acted upon by an applied force of a touch object,
wherein the touch-sensitive panel further includes a calculating circuit coupled to the induction line,
wherein the calculating circuit is configured to receive the touch-sensing signal through the induction line, and to calculate a position of the applied force of the touch object on the touch-sensitive panel according to the touch-sensing signal and the scanning signals,
wherein the scanning signals provided by two adjacent scanning lines are different by a high level duration,
wherein the control device further comprises:
a first thin film transistor (TFT) switch, and a second TFT switch,
wherein the first TFT includes a first gate coupled to the scanning line, wherein the first gate is configured to receive the scanning signal; a first source coupled to the data line, wherein the first source is configured to receive the data signal; and a first drain, wherein the first TFT switch is configured to control on and off states of a first current channel between the first source and the first drain,
wherein the second TFT includes a second gate coupled to the first drain; a second source coupled to the display device; and a second drain,
wherein the second TFT switch is configured to control on and off states of a second current channel between the second source and the second drain according to the data signals when the first current channel is turned on, and
wherein the LED display panel further comprises:
a storage capacitor, a first plate of the storage capacitor coupled to the first drain, a second plate of the storage capacitor coupled to the second source, wherein the storage capacitor is configured to receive the data signals when the first current channel is turned on, to store charges which correspond to the data signals, and to release the corresponding charges to the second gate when the first current channel is turned off for making the second current channel remain an on state,
wherein the display device comprises a cathode layer, an organic emissive layer, and an anode layer,
wherein the organic emissive layer is disposed between the cathode layer and the anode layer, and the anode layer is coupled to the second drain through a second through hole,
wherein a width of a first region in the induction line is less than a width of a second region, wherein the first region is a region where the induction line and the scanning line intersect with each other, and the second region is a region except the first region in the induction line, and wherein a width of a third region in the scanning line is less than a width of a fourth region wherein the third region is a region that the scanning line and the induction line intersect with each other and the fourth region is a region except the third region in the scanning line.

* * * * *